(12) United States Patent
Hageltorn et al.

(10) Patent No.: US 6,847,820 B1
(45) Date of Patent: *Jan. 25, 2005

(54) SLANTED HUB LAYOUT FOR WIRELESS NETWORKS

(75) Inventors: Göran Hageltorn, Gloucester (CA); Adrian Florea, Ottawa (CA)

(73) Assignee: Alcatel Canada Inc., Kanata (CA)

(*) Notice: Subject to any disclaimer, the term of this patent is extended or adjusted under 35 U.S.C. 154(b) by 515 days.

This patent is subject to a terminal disclaimer.

(21) Appl. No.: 09/624,078

(22) Filed: Jul. 24, 2000

(51) Int. Cl.[7] .............................. H04Q 7/20; H04H 3/00
(52) U.S. Cl. .................... 455/446; 455/447; 455/562.1; 370/328
(58) Field of Search ................................ 455/446–448, 455/561–562, 562.1, 429, 500, 422.1; 370/328

(56) References Cited

U.S. PATENT DOCUMENTS

| | | | |
|---|---|---|---|
| 5,668,610 A | | 9/1997 | Bossard et al. ............. 348/723 |
| 5,809,431 A | * | 9/1998 | Bustamante et al. ..... 455/562.1 |
| 5,838,670 A | * | 11/1998 | Billstrom .................... 370/328 |
| 5,949,793 A | | 9/1999 | Bossard et al. ............. 370/487 |
| 6,141,557 A | * | 10/2000 | Dipiazza ..................... 455/446 |
| 6,205,337 B1 | * | 3/2001 | Boch ........................... 455/447 |
| 6,275,704 B1 | * | 8/2001 | Dixon ......................... 455/446 |
| 6,445,926 B1 | * | 9/2002 | Boch ........................... 455/447 |
| 6,553,234 B1 | * | 4/2003 | Florea ......................... 455/447 |

FOREIGN PATENT DOCUMENTS

| | | | |
|---|---|---|---|
| EP | 0 429 200 A3 | 10/1990 | |
| EP | 0 429 200 A2 * | 5/1991 | ............ H04H/3/00 |

* cited by examiner

Primary Examiner—William Trost
Assistant Examiner—Brandon J. Miller
(74) Attorney, Agent, or Firm—Marks & Clerk

(57) ABSTRACT

A system and method for optimizing frequency re-use in a cellular, wireless communications system. In a geographic area, which can be serviced by a cluster of four cells in a two by two arrangement, 100% frequency can be achieved over the entire area by utilizing a slanted hub arrangement. In a larger geographic area requiring a greater number of cells, efficient frequency spectrum re-use is achievable by identifying narrow interference slivers in each cell and servicing these slivers in accordance with optional procedures.

10 Claims, 11 Drawing Sheets

LEGEND

Shaded: D/S V-pol.
Un-shaded: D/S H-pol.

Straight 4 Hub D/S Interference (Polarization B)

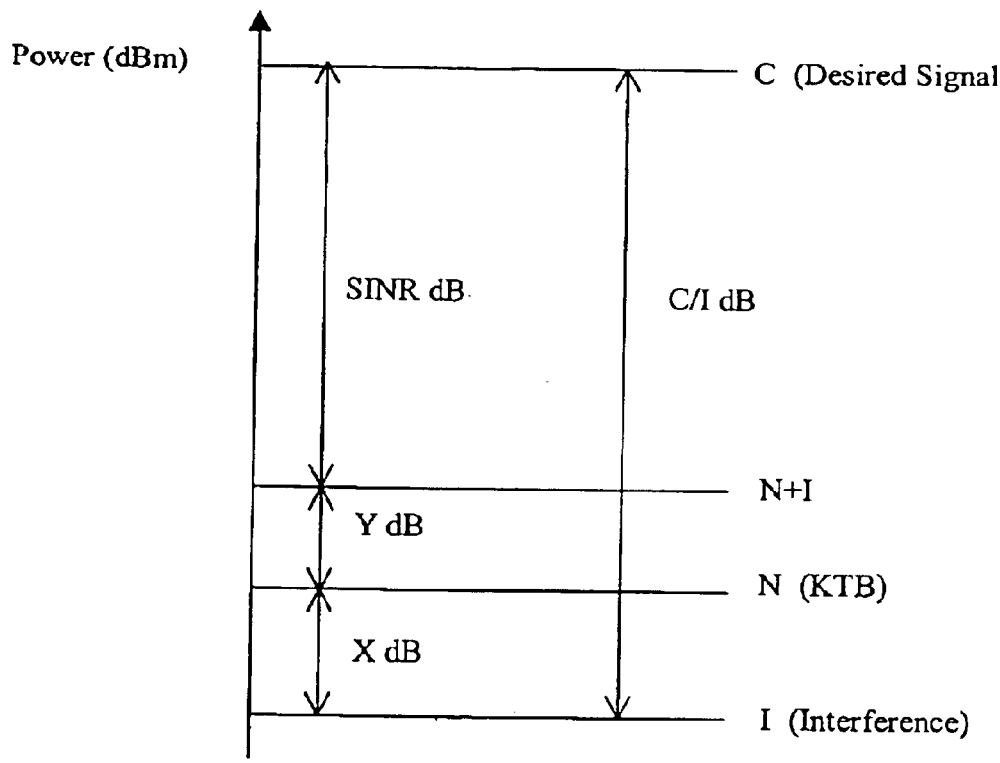
Figure 1. Graphical Representation of SINR and C/I
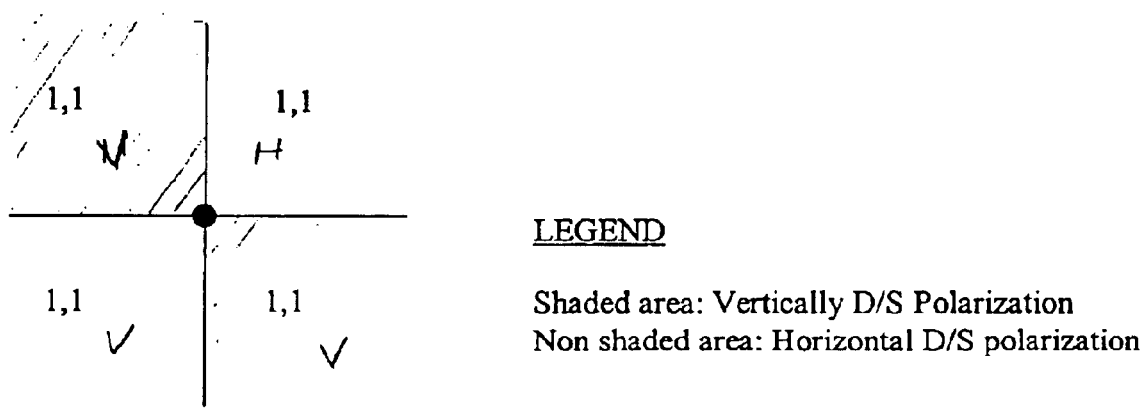
Figure 2. Single Cell Frequency Layout

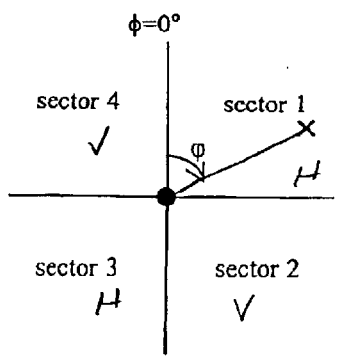
Figure 3. Single Cell C/I
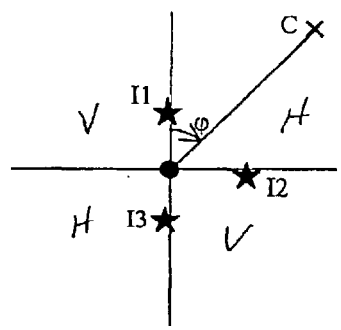
Figure 4. U/S Single Cell C/I
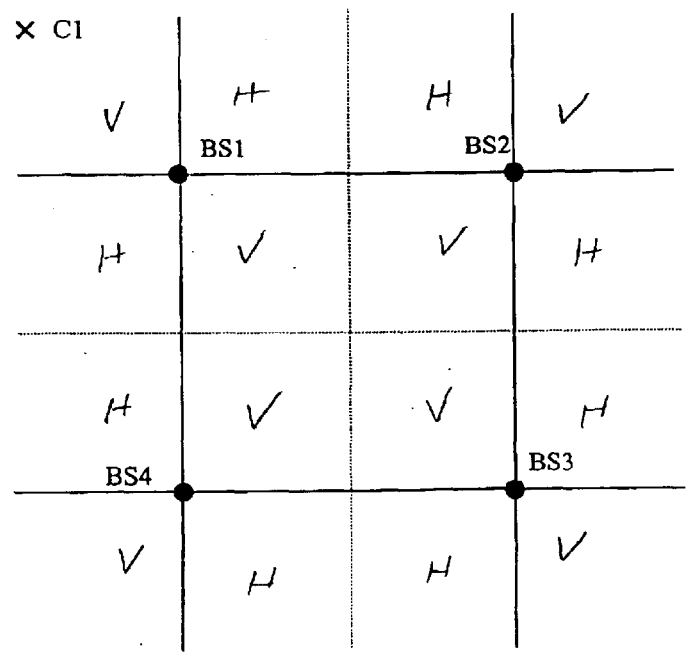
Figure 5. Straight 4 Hub Basic Layout

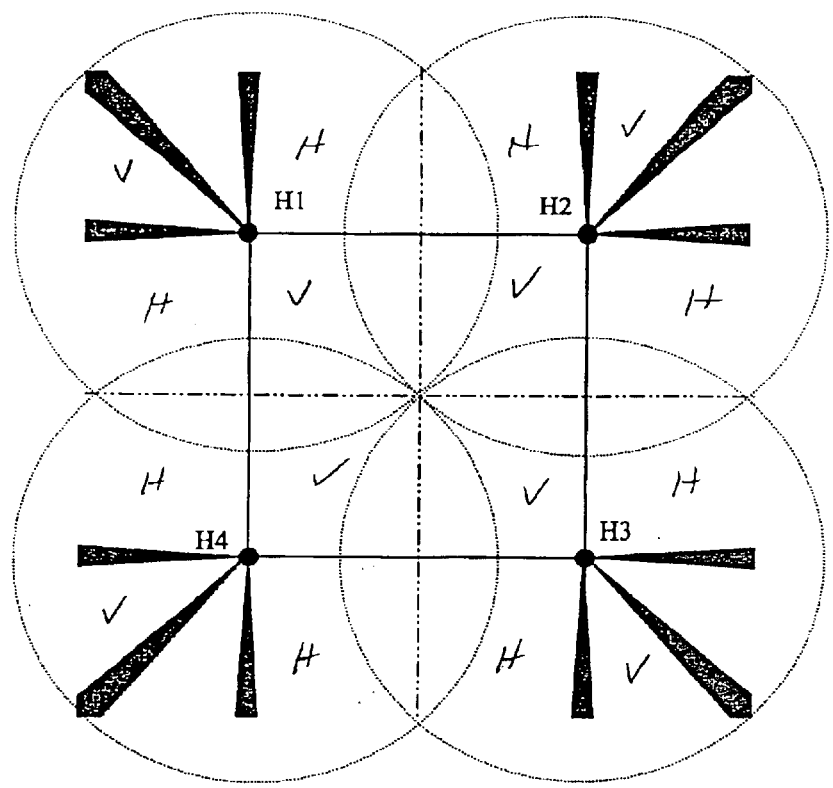
Figure 6. Straight 4 Hub D/S Interference Slivers (Polarization A)
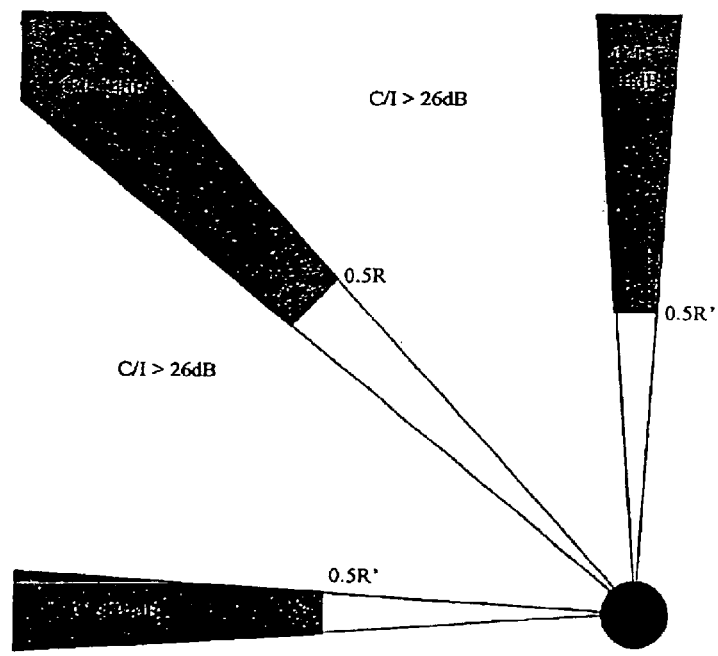
Figure 7. Straight 4 Hub D/S Interference vs. r

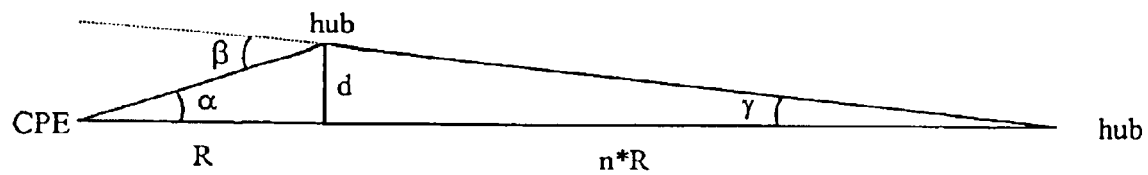
Figure 8. Interference Sliver Widths
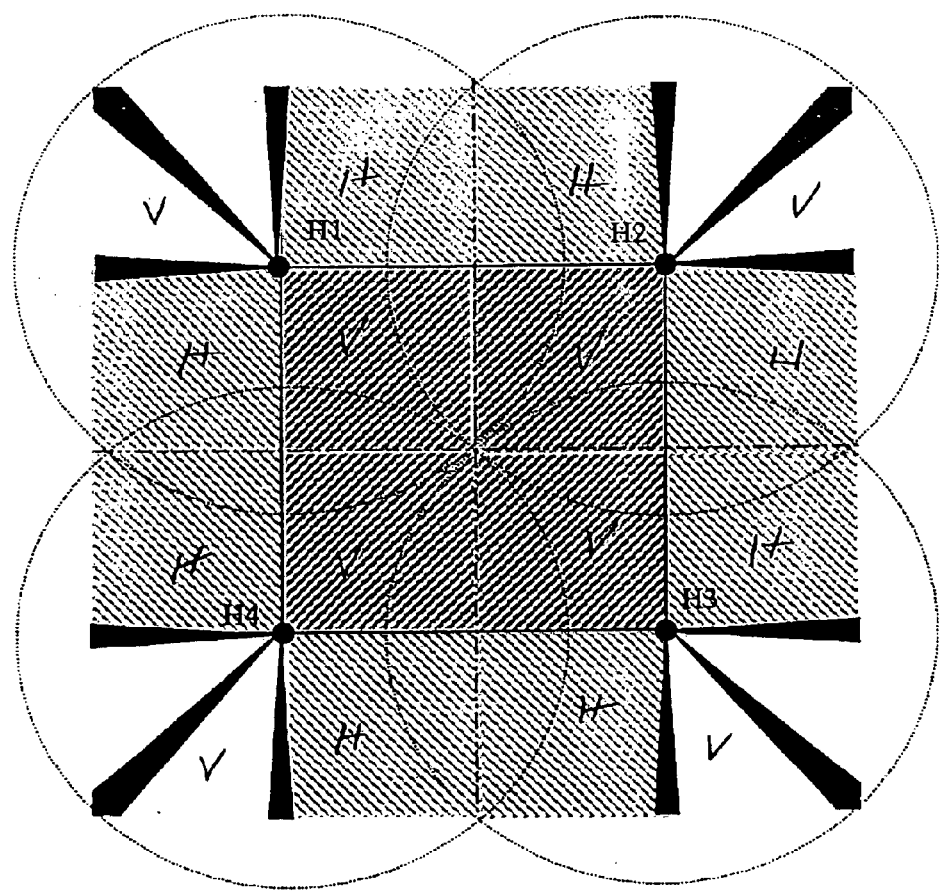
Figure 9. Straight 4 Hub U/S Interference (Polarization A)

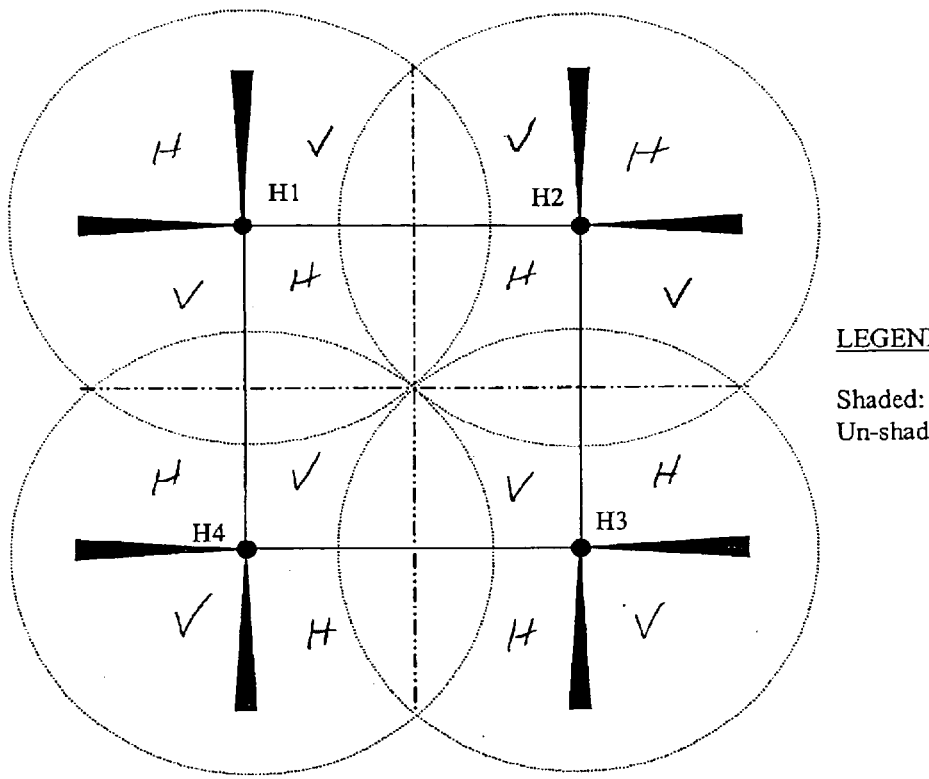
Figure 10. Straight 4 Hub D/S Interference (Polarization B)
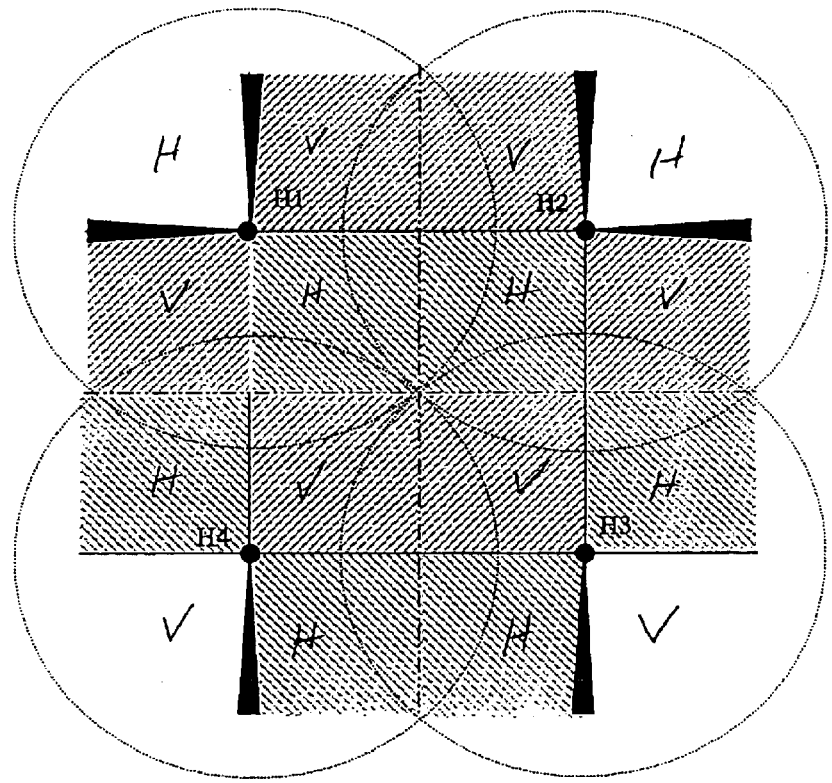
Figure 11. Straight 4 Hub U/S Interference (Polarization B)

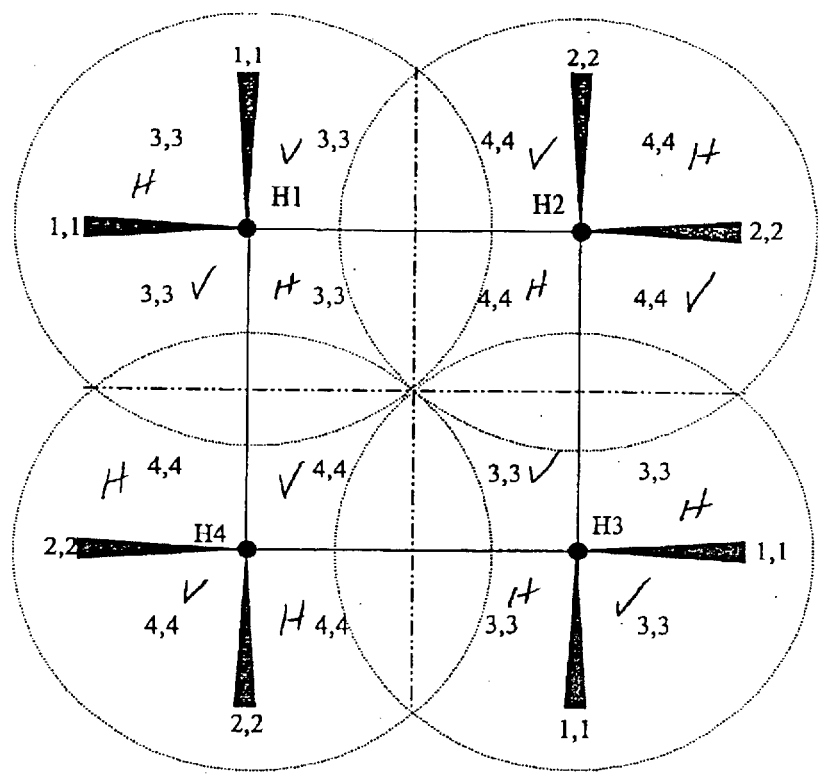
Figure 12. Straight 4 Hub D/S and U/S Frequency Layout (Polarization B)
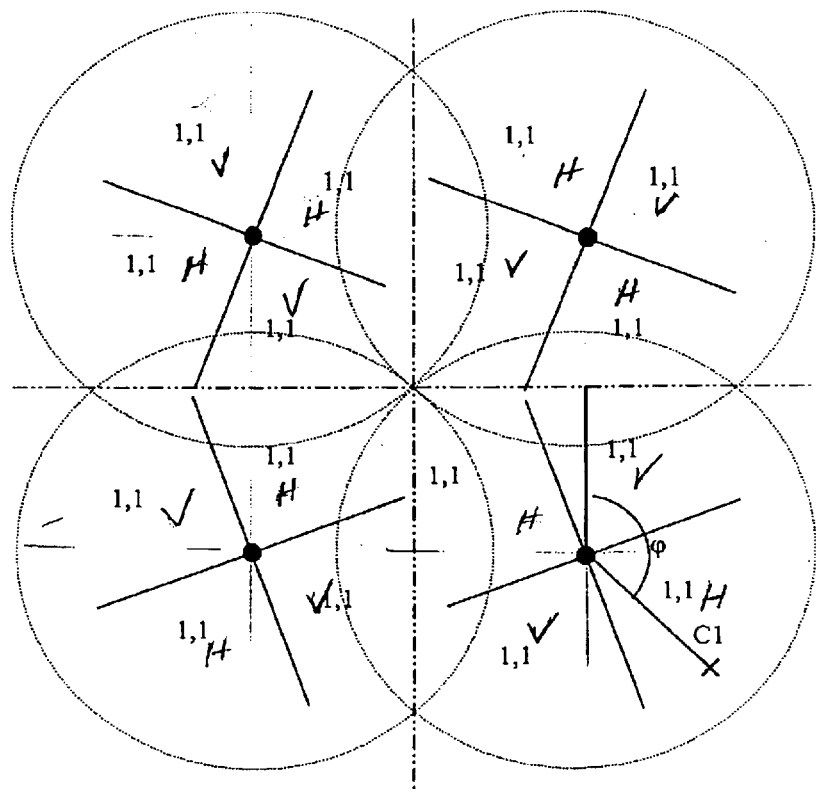
Figure 13. Slanted Hubs in 4 Hub Network

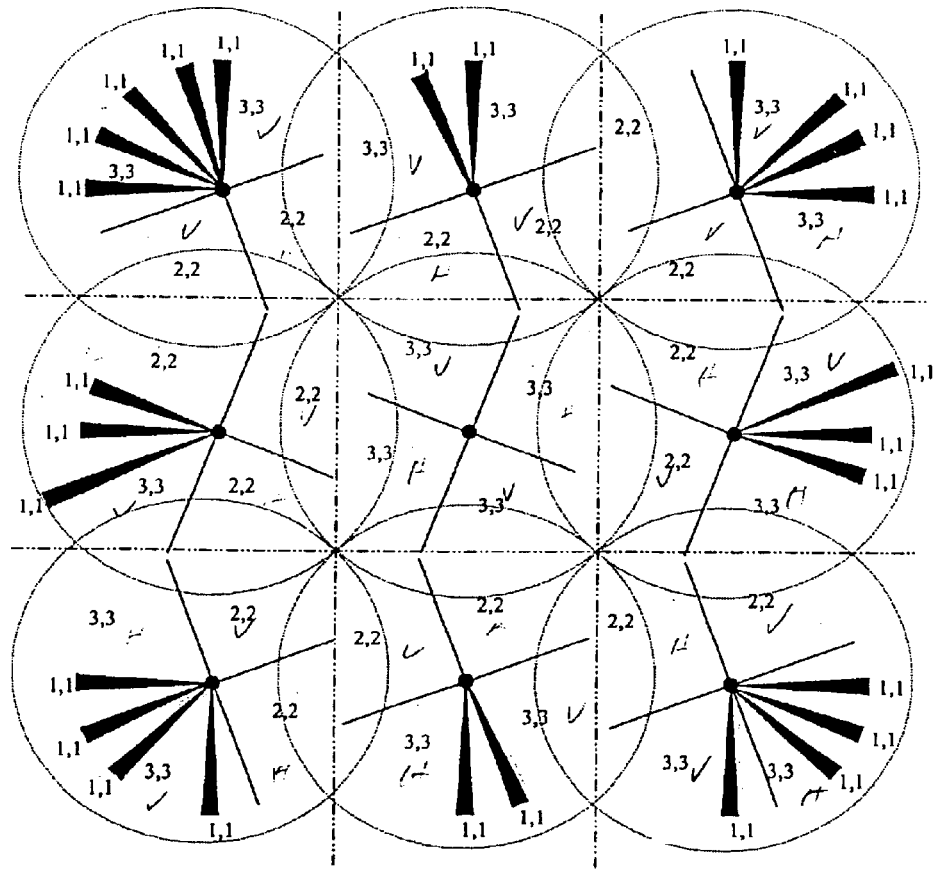
Figure 14. Slanted Hubs in 9 Hub Network, D/S and U/S Frequency Assignment
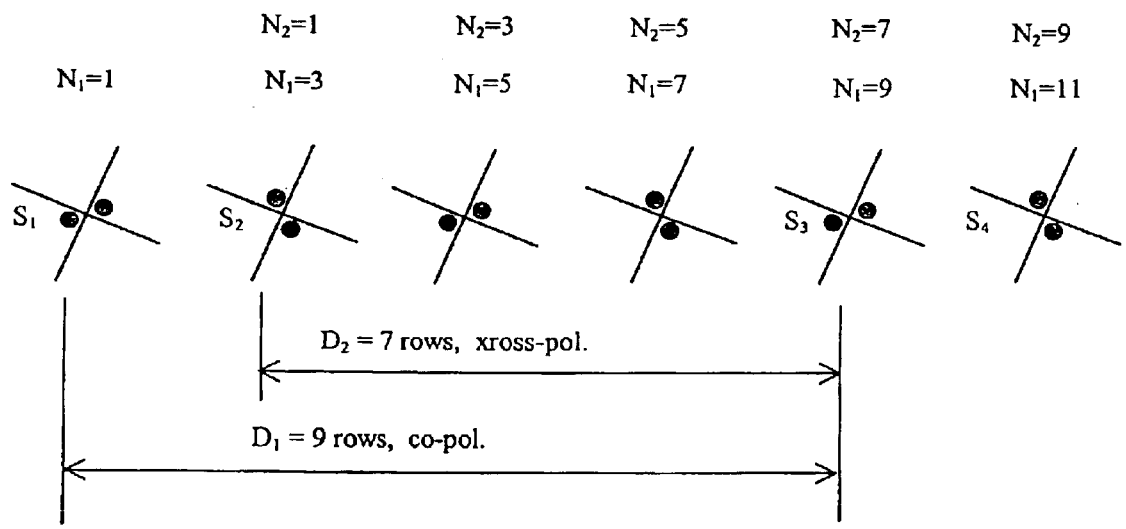
Figure 15. Re-use in Slanted Hub Layout

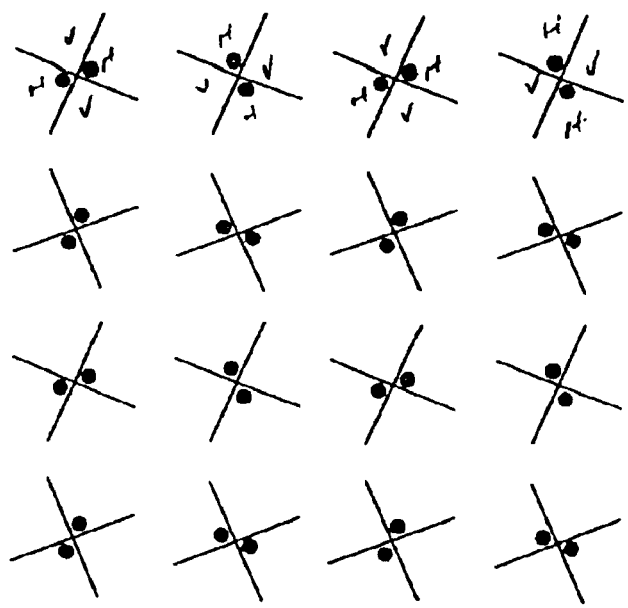
Figure 16. 4x4 Cluster, Sectorization and Polarization
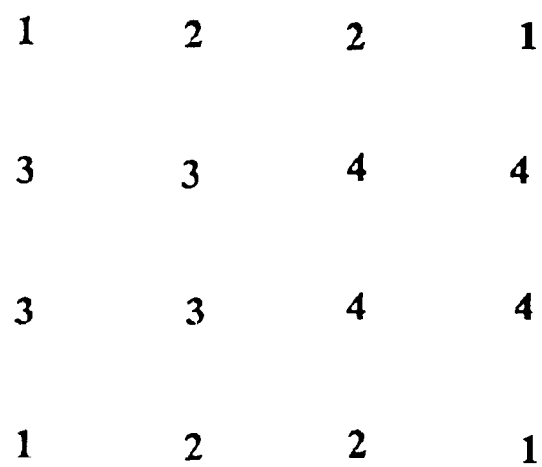
Figure 17. 4x4 Cluster, Frequency Re-use

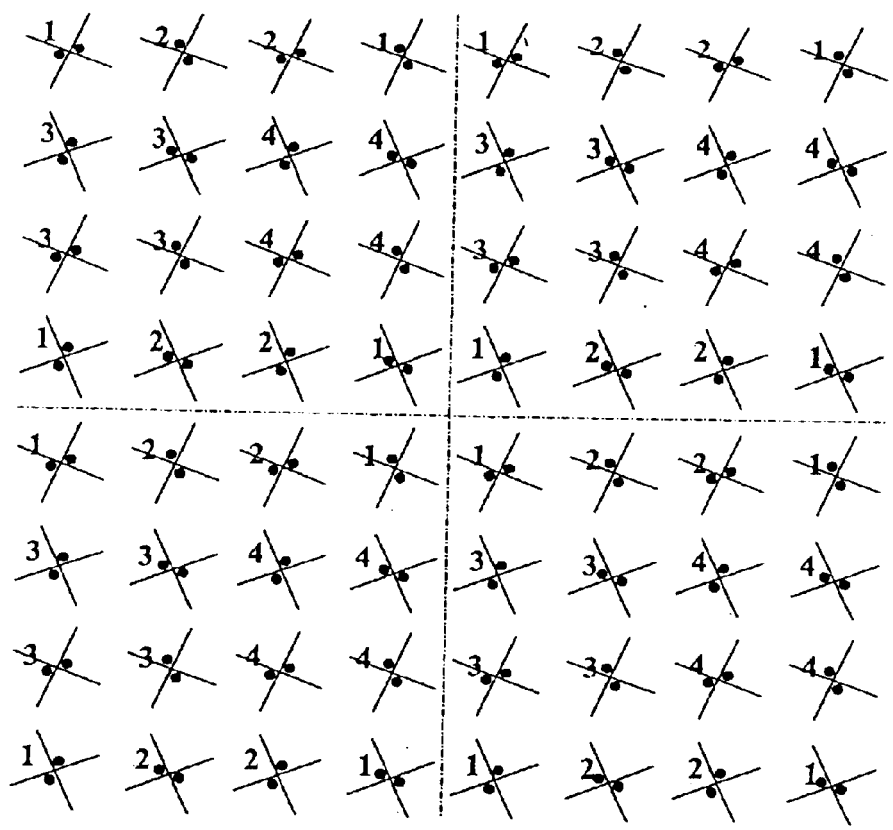
Figure 18. 4x4 Cluster, Complete Layout
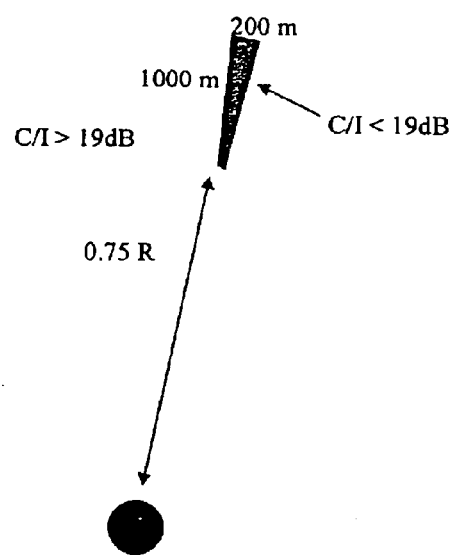
Figure 20. Sliver (detail) in Final Layout

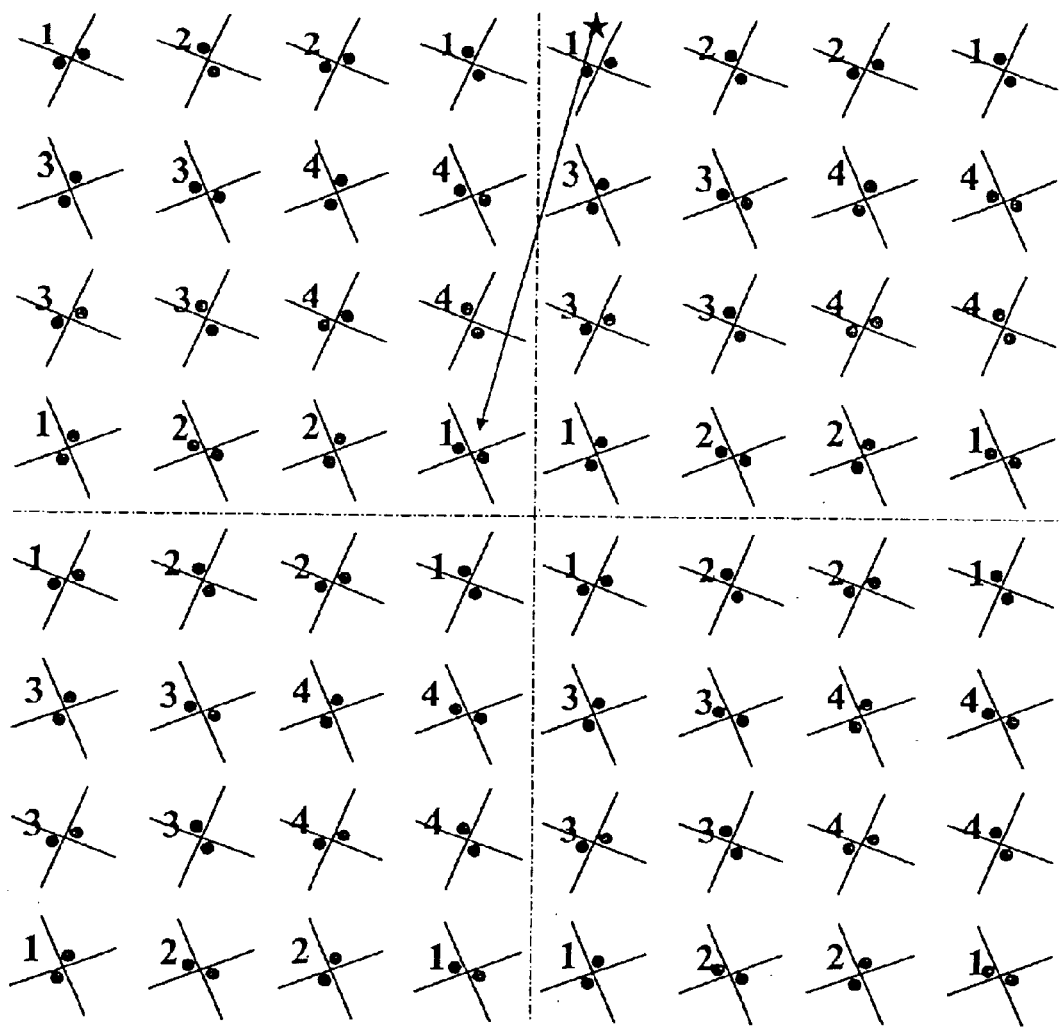
Figure 19. Sliver(s) in Final Design
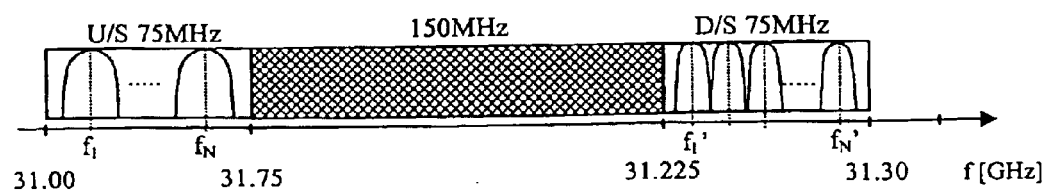
Figure 21. LMDS U.S. B-Band

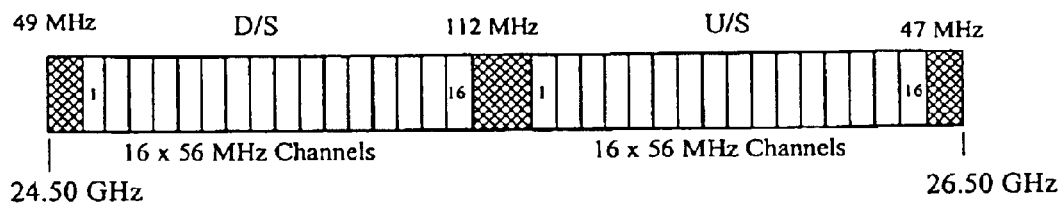
Figure 22. ETSI 26 GHz Spectrum Overview (56 MHz sub-band option)
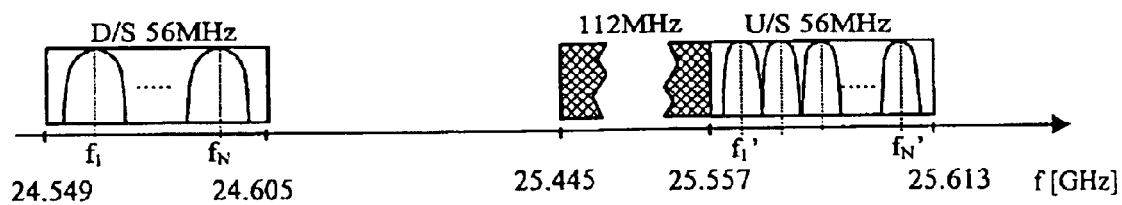
Figure 23. ETSI 26 GHz Spectrum (Detailed Example)

SLANTED HUB LAYOUT FOR WIRELESS NETWORKS

FIELD OF THE INVENTION

This invention relates to bi-directional broadband wireless communications between base stations and customer sites located within a geographical area and more particularly to a cellular, broadband wireless communication system, utilizing sectored antennas, which combines a polarization scheme with sector orientation to provide improved frequency re-use.

BACKGROUND

Broadband wireless systems such as Local Multipoint Distribution Systems (LMDS), known as Local Multipoint Communication System (LMCS) in Canada, are being developed to provide point to multipoint, high bandwidth services between a base station connected to a backbone such as an asynchronous transfer mode (ATM) network and network interface units (NIUs) at fixed or mobile locations within a defined geographic area known as a cell. A wireless link between the base station and the NIUs operates at a wireless radio frequency (RF) typically in the 28 GHz range depending on the allocated frequency license. A transceiver at the base station and a transceiver at each NIU site supports bi-directional, broadband "last mile" communication between a service provider and a customer.

Traditional wireless access systems employ one polarization or another (vertical or horizontal, for example) as a means for delivering services over a radio medium to a given customer(s) site. These systems tend to be optimized for specific types of services that are largely dictated by the radio licensing structure and/or regulatory requirements. With the advent of broadband licensing (LMDS/LMCS, for example), large numbers of different service types can be offered using a common delivery infrastructure. These varying services can be low bandwidth in nature (so called POTS, T1 or E1, fractional T1 or E1, Ethernet, or others, for example) or can be high bandwidth in nature (so called T3 or E3, OC_n, or others, for example). Typically, the low bandwidth services are more cost effectively delivered through the sharing of radio resources. This can be achieved by sharing the radio resources in time, for example, using techniques such as time division multiple access, (TDMA). This technique divides a given radio-communication channel up into time slots which are allocated in a fixed or dynamic manner to the various customer site equipment which are sharing this radio channel/resource. Although this tends to be more cost effective, this type of access technique commonly employs lower efficiency modulation schemes, quadrature phase shift keying (QPSK), for example, which utilize more spectrum/license.

Typically the high bandwidth services are not as cost sensitive but demand much a more capacity and therefore need to be connected using high efficiency modulation techniques, quadrature amplitude modulation (QAM), for example. These are not amenable to radio resource sharing and therefore are more optimally run within independent radio channels. The technique of using a number of independent radio channels serving one customer site each is referred to as frequency division multiplexing (FDM).

The frequencies available for RF wireless communication are limited and there is an economic incentive to make the best use of the band of frequencies covered by a particular frequency license. Prior art Radio Frequency (RF) wireless networks have been designed to optimally utilize the allocated RF Spectrum, maximize capacity and to minimize the cost of the system. Different solutions have been proposed for various applications.

In a cellular system a typical cell is configured to provide service to a geographic area. The cell, often described generally as a circular area, has a more or less central base station or hub with the necessary hardware to conduct point to multipoint, downstream communication with user stations within the cell. Each user station is also provided with the hardware including a directional transceiver for conducting point to point upstream communications with the base station. Depending on the application, the cell may be divided into sectors and sectored antennas are situated at the base station site to provide restricted communication within a particular sector. A typical cell may have a diameter in the 3 to 5 km range.

For a large geographic area, such as a metropolitan area, a number of similar cells are laid out in a slightly overlapping configuration to provide complete coverage. Each cell has its own base station or hub, possibly with a sectored antenna, to subdivide the cell into a plurality of sectors. In an ideal situation each cell employs the same frequency band for each sector in a base station to user site direction, known herein as downstream (D/S), and another frequency band within each sector for transmission from the user site to the base station (upstream or U/S). When more than one cell is required to cover an area, however, inter-cell interference caused by the common frequency band becomes a significant problem. One method of overcoming this form of interference is to use different frequency bands in each cell. Because of frequency licensing restrictions a service provider has a limited frequency range with which to work and consequently is unlikely to have sufficient frequency bands to provide different frequencies for each cell. Consequently, it is important to make efficient re-use of frequency sets (U/S and D/S) in cells within a geographic area.

For fixed wireless point-to-multipoint systems, a common network configuration is the straight grid design, wherein a number of central hubs (base stations) are located at the intersection points between perpendicular imaginary gridlines. These hubs communicate through radio-wave propagation over the air to a multitude of peripheral transmit/receive units or Customer Terminals (CTs) that may be fixed or mobile in nature.

Since a multitude of RF signals may be transmitted simultaneously in the network coverage area there is a risk that interference will occur where the desired signal or Carrier (C) is drenched by the Interfering signal(s) (I). Here C and I would typically (but not always) be of the same frequency. To mitigate interference, i.e. to isolate the desired signal from interfering signals, various measures have been developed, for instance, by using time division, antenna polarization, coding or spatial separation.

Spatial separation is widely used but has the disadvantage that the utilization of the RF Spectrum suffers. A metric called Frequency Re-use is used to quantify how effectively the allocated spectrum is used.

Polarization diversity may also be employed in sectored cells to improve frequency re-use. In co-pending U.S. application Ser. No. 09/073,217 to Boch, the contents of which are incorporated herein by reference, adjacent sectors employ orthogonal polarization to reduce cross-polar interference. Additionally, upstream transmission (customer site to base station) and downstream transmission (base station to customer site) employ orthogonal polarization to reduce co-polar interference.

U.S. Pat. No. 5,949,793 which issued Sep. 7, 1999 discloses a sectored cell configuration for transmission of broadband programming such as TV plus digital communications services. The '793 patent also employs polarization diversity between adjacent sectors. The '793 patent also illustrates without detailed description the concept of skewing sectors with respect to sectors in adjacent cells.

Polarization diversity is also discussed in U.S. Pat. No. 5,809,431 to Bustamante et al and in U.S. Pat. No. 5,838,670 to Billstrom.

SUMMARY OF THE INVENTION

The present invention achieves superior frequency re-use and concomitant gains in system capacity and efficiency, by rotating (slanting) the sectors in the network cells relative to each other in a prescribed manner. The present invention also implements a specialized orthogonal polarization scheme that is particularly advantageous for transmission of Radio Waves in small or medium sized geographical areas, i.e. 4 to 9 cells. According to the invention the scheme for rotating or slanting the sectors achieves significant reductions in inter-cell interference. Prior art layouts typically use the same "straight" sectorization from cell to cell whereas the preferred embodiment of this invention alternate the orientation of the sectors (from cell to cell) by approximately ±22.5°.

This invention is applicable to point-to-multipoint wireless RF Networks, where sectored cells (for example, 90°) are used and where the isolation of signals between sectors may be accomplished by orthogonal polarization and/or coding and/or Time Division or by other means. The peripheral units or customer premise equipment, that may be transceivers or receivers, utilize highly directional antennas which are well suited to higher frequencies, thus being applicable to Fixed Wireless Systems such as Local Multipoint Communication Systems/Local Multipoint Distribution Systems (LMCS/LMDS) and Multicarrier Multipoint Distribution Systems (MMDS).

The invention also identifies inter-cell interference zones, known herein as slivers, where, under certain conditions, interference cannot be avoided and provides methods of dealing with this limitation.

The invention described herein, offers a RF Network solution that features a better frequency re-use than what is achievable with the known prior art.

Therefore in accordance with a first broad aspect of the invention there is provided a method of improving frequency spectrum deployment in a cellular wireless communications system having multiple adjacent cells which provide service to a geographic area, each cell having a base station with a sectored antenna for bi-directional communication with customer premise equipment located in sectors of the cells, the base stations in adjacent cells being arranged in a grid configuration, the method comprising: selecting at least one frequency set for upstream and downstream communication between the base stations and the customer premise equipment; employing polarization diversity between communications in adjacent sectors; and rotating the sectors in each cell such that dividing lines between sectors are off-set relative to the grid configuration by a configurable angle.

In accordance with a preferred embodiment of this aspect of the invention the off-set angle is +/−22.5°.

In accordance with a second broad aspect of the invention there is provided a system for improving frequency spectrum deployment in a cellular wireless communications system having multiple adjacent cells to provide communications service to a geographic area, the system comprising: a base station in each cell having a sectored antenna for providing bi-directional communication with customer premise equipment (CPE) located in sectors of the cells, the base stations in adjacent cells being arranged in a grid configuration; a directional antenna at each CPE for receiving downstream communication from the base station and transmitting upstream communication to the base station; means to select at least one frequency set for upstream and downstream communication between the base stations and the customer premise equipment; means to employ polarization diversity between communications in adjacent sectors; and means at the base station to configure the sectors in each cell such that nominal dividing lines between sectors are off-set relative to the grid configuration by a configurable angle.

BRIEF DESCRIPTION OF THE DRAWINGS

The invention will now be described in greater detail having reference to the attached drawings wherein:

FIG. 1 is a graphical representation of the Signal to Interference plus Noise Ratio (SINR) and Carrier to Interference (C/I) Ratio in a wireless system;

FIG. 2 represents a single cell frequency layout for a four sectored configuration;

FIG. 3 illustrates a single cell C/I;

FIG. 4 illustrates a single cell C/I for upstream transmission;

FIG. 5 illustrates a straight four hub basic layout;

FIG. 6 illustrates interference slivers for a particular polarization scheme (polarization A) for downstream transmission in a straight four hub layout;

FIG. 7 shows the interference slivers of FIG. 6 in relation to their distance from the hub;

FIG. 8 illustrates the respective widths of the interference slivers relative to the hub and customer premise equipment (CPE);

FIG. 9 illustrates interference slivers for polarization A for upstream transmission in a straight four hub layout;

FIG. 10 illustrates interference slivers for a second polarization scheme (polarization B) for downstream transmission in a straight four hub layout;

FIG. 11 illustrates the interference slivers for polarization B for upstream transmission in a straight four hub layout;

FIG. 12 illustrates the interference slivers for polarization B for upstream and downstream frequency layout in a straight four hub configuration;

FIG. 13 illustrates a slanted configuration for a four hub layout;

FIG. 14 illustrates interference slivers for upstream and downstream frequency assignment for slanted nine hub configuration;

FIG. 15 shows frequency re-use in slanted hub layout;

FIG. 16 shows sectorization and polarization of a four by four cluster;

FIG. 17 shows frequency re-use in a four by four cluster;

FIG. 18 illustrates a scaleable layout utilizing four by four clusters;

FIG. 19 shows interference slivers in layout having four by four clusters;

FIG. 20 illustrates in detail the interference sliver of FIG. 19;

FIG. 21 illustrates the LMDS B-band frequency spectrum for use in the USA;

FIG. 22 shows a portion of the spectrum assigned to Broadband use in Europe; and FIG. 23 shows in detail the spectrum assignment of FIG. 22.

DETAILED DESCRIPTION OF THE INVENTION

A wireless system which may be an ATM based Broadband Wireless Access (BWA) system according to an exemplary embodiment of the present invention features a cell layout scheme that is dependant on several factors such as market size, market demographics, market geographics and the frequency reuse factor required in a given market. The present application describes some of the basic characteristics of a few possible cell layout structures. It also discusses a design process leading to a scaleable network, that aims at optimally balancing conflicting parameters such as: area coverage, capacity, frequency re-use and cost of the infrastructure. The following deals mainly with but is not limited to small to medium sized spectrum deployments.

With the amount of spectrum available in U.S. for B-band operation, (see FIG. 21), or in Europe, (see FIG. 22), the Network Design becomes somewhat challenging. However, with careful and thorough analysis, these limited frequency resources can be optimally utilized to provide a high performance broadband wireless access network. In FIGS. 21 and 22 exemplary upstream (U/S) and downstream (D/S) frequency bands are shown separated by a guard band. It is a goal of the present invention to maximize re-use of the frequency bands within a set geographic area serviced by a plurality of cells. In FIG. 21 the U.S. B-band consists of two 75 MHz chunks straddling a portion (150 MHz) of the A-band. In the present LMDS offering, the lower block is used for D/S operation and the upper for U/S operation. In order to facilitate co-existence with adjacent operators, it is desirable that adjacent operators also use the same allocation.

In Europe the ETSI band is typically divided into one D/S and one U/S block, which in turn are divided further into sub-blocks. The number and size of the sub-blocks will vary from BTA to BTA. In the example below the D/S and U/S blocks are respectively split into 16 sub-blocks, each comprising 56 MHz. It is up to the licensees of these sub-blocks to decide on the numbers of carriers and carrier bandwidths to use in their sub-blocks.

Within the allocated frequency bands, it is possible to tailor the channel bandwidths in order to provide an optimum blend of network capacity and coverage. Generally speaking, a small number of wide channels offers very high data rates to a limited number of customers while a large number of narrower channels gives more flexibility in terms of interference suppression measures. The end result of the latter approach is an increase in coverage and frequency re-use at the expense of lower data rates for each individual customer.

It should be recognized that, by increasing the number of channels per sector, the cost of the infrastructure also goes up. As an example: for a 4 sector hub it would take 8 radio interface units to offer two 36 MHz channels per sector. These 8 interface units typically can be housed in one shelf whereas if the number of channels is increased to three per sector, the number of radio interface units (i.e. 12) requires that two shelves be used.

Another factor that must be considered is the interference levels that can be tolerated in the networks for the worst case condition, i.e. when a CPE is at the cell edge and during severe rain fade. It has been suggested that under these conditions allowance should be made for 2 dB receive sensitivity degradation compared to non-interference condition.

The required C/I that the network should be designed for can be calculated as:

$$C/I = -10\text{Log}\left(10^{\frac{Y}{10}} - 1\right) + SINR + Y \qquad \text{Equation 1-1}$$

Where SINR is the minimum signal-to-interference-plus-noise-ratio level that can be tolerated by the system. FIG. 1 is a graphical representation of SINR and C/I levels.

Assuming that a 2 dB degradation over thermal noise floor is acceptable the following values (rounded upwards) of C/I can be calculated:

|  | D/S | U/S |
| --- | --- | --- |
| Modulation | QPSK | QPSK |
| SINR | 9.5 dB | 14.3 dB |
| C/I | 14 dB | 19 dB |

These values are representative only and are not to be taken as limiting.

FIG. 2 illustrates a four-sectored cell deploying the same U/S and D/S frequency sets in each sector. Deploying a single cell is relatively straightforward. Every D/S frequency channel (n channels) and U/S frequency channel (m channels) may be re-used in every single sector as follows:

| D/S Frequency group 1: | $F_1 \ldots F_n$ |
| --- | --- |
| U/S Frequency group 1: | $f_1 \ldots f_m$ |

Where,

X,Y designate frequency group X for the D/S and frequency group Y for the U/S

U/S and D/S are in general orthogonally polarized in each sector (exceptions to this will be made in areas where regulations or standards so stipulate). For the single cell scenario of FIG. 2 the C/I will be determined only by the antennas and radio channel characteristics.

In clear sky conditions there will be negligible polarization distortion introduced by the radio channel itself and consequently the antenna characteristics will be the dominating factor.

Define:
| HUB co-polar antenna gain: | $\text{Ghub}(\psi-\psi_n)$ [dB] |
| --- | --- |
| HUB cross-polar antenna gain: | $\text{Xhub}(\psi-\psi_n)$ [dB] |
| CPE co-polar antenna gain: | $\text{Gcpe}(\psi-\psi_n)$ [dB] |
| CPE cross-polar antenna gain: | $\text{Xcpe}(\psi-\psi_n)$ [dB] |

Each variable is normalized to the maximum gain value of the main polarization for the antenna and varies with the angle $(\Psi-\Psi_n)$. $\Psi$ is defined as zero° in the 12'o clock direction and assumes increasing values in a clockwise rotation. $\Psi_n$ is the boresight direction of the hub antenna in the n:th sector as shown in FIG. 3.

Co- and cross-polar gains for all antennas are with respect to the main polarization of the desired CPE antenna.

As illustrated in FIG. 3, the 'X' indicates the position of one particular user located in sector 1. Due to the hub antenna pattern roll-off in azimuth, the users with the worst C/I will be the ones located along the sector dividing lines i.e. $\Psi=0°$, $90°$, $180°$ and $270°$. These users are affected by the cross-polarized, co-channel interference from the adjacent sector as well as the co-polarized, co-channel interference from the opposite sector. The users that are farther away from the adjacent sectors are mostly affected by the hub co-polar gain, causing interference from the opposite sector.

The worst case C/I, occurs for $\Psi=0°$, $90°$, $180°$ and $270°$). Here $\Psi=90°$ is assumed:

$$\frac{C}{I}(\varphi) = 10*\log\left(\frac{10^{\frac{Ghub(\varphi-\varphi_1)+Gcpe(0)}{10}}+10^{\frac{Xhub(\varphi-\varphi_1)+Xcpe(0)}{10}}}{\sum_{n=2}^{4}10^{\frac{Ghub(\varphi-\varphi_n)+Gcpe(0)}{10}}+10^{\frac{Xhub(\varphi-\varphi_n)+XPcpe(0)}{10}}}\right) = 24 \text{ dB}$$

Best case C/I, occurs for $\Psi=45°$, $135°$, $225°$ and $315°$. Where $\Psi=45°$ is assumed:

$$\frac{C}{I}(\varphi) = 40 \text{ dB}$$

The D/S interference will, in this case, also come from the two cross-polarized sectors as well as the opposite one and their contributions are included in the calculation above. It turns out that the three interfering sectors add similar amount of interference.

The upstream C/I is much harder to analyze due to the fact that interference is caused by multiple users that can be located anywhere in the 4 sectors, and that will be transmitting at the same time on the same channel.

In FIG. 4, the interference is caused by the three interferers marked by star-shaped markers.

Assuming perfect U/S power control, the U/S carrier to interference ratio for a CPE placed in sector 1 becomes:

$$\frac{C}{I}(\varphi) =$$

$$10*\log\left(\frac{10^{\frac{Ghub(\varphi_1-45)+Gcpe(0)}{10}}+10^{\frac{Xhub(\varphi_1-45)+Xcpe(0)}{10}}}{\sum_{n=2}^{4}10^{\frac{Ghub(\varphi_n-45)+Gcpe(0)}{10}}+10^{\frac{Xhub(\varphi_n-45)+XPcpe(0)}{10}}}\right) = 24 \text{ dB}$$

Deploying a single hub is simple since adequate isolation is "built into" the system due to strict antenna specifications. 100% frequency re-use can be used in all the sectors. Attention will have to be taken if other operators are co-existing in an adjacent frequency band or using the same frequencies in an adjacent service area.

FIG. 5, shows the basic layout of what is known here as a straight 4 hub network. As will later be shown, there are some benefits that can be gained from carefully choosing the polarization of the individual sector so to maximize the frequency reuse. In FIG. 5 the sectors marked with cross hatching have the same polarization.

In FIG. 5, the user C1, is prone to strong interference coming from hub BS3. The resulting C/I for the down stream would be for N=3 ($3^{rd}$ row interference):

$$\frac{C}{I} = -10*\log\left[\frac{1}{N^2}\right] = 9.5 \text{ dB} \qquad \text{Equation 1-2}$$

This C/I is too poor, as a down stream C/I of 14 dB is required.

Due to the narrow main beams of the subscriber's antennas there will be a number of quite narrow slivers of the cell sectors where interferers actually will line up with the desired hubs. A qualitative view of the extent and location of the interference slivers where D/S interference will occur is shown in FIG. 6 which represents the strait 4 hub layout of FIG. 5. In FIG. 6 any CPE located within these slivers will be subject to D/S interference.

Since the C/I decreases as the distance to the hub increases, it is possible to use the interference slivers for CPEs that are located closer to the hubs as opposed to farther out into the sector.

The maximum distance between the CPE and the hub, required to reach a particular C/I can be calculated by using the following equation:

$$r = \frac{N-1}{10^{\frac{C/I}{20}}-1} \qquad \text{Equation 1-3}$$

where, r is the distance between the CPE and the hub normalized to the base (R) used to define the N:th row interference. In this 4 hub network, N is equal to 3.

It can then be found that in order to achieve a D/S C/I of 14 dB for $3^{rd}$ row interference the CPE has to be less than 0.5 R away from the hub.

From Equation 1-2, it can be seen that for 14 dB C/I on the D/S, it is possible to achieve improved coverage by placing some CPEs within the interference slivers with the condition that the CPE to hub separation has to be less than 0.5 R The width of the slivers is affected by the gain roll-off in the CPE antenna pattern as well as the geometry of the CPEs and hubs, that either act as the interferer(s) or the victim(s) of interference.

$$\beta = \arctan\left[\frac{\tan(\alpha)}{n}\right] + \alpha \qquad \text{Equation 1-4}$$

In Equation 2-4, $\beta$ denotes half the width (angle) of the interference sliver and $\alpha$ is the angle off the CPE antenna boresight, where the gain towards the interferer (or the victim of interference) has fallen to such a value that C/I ratio becomes acceptable.

Due to reciprocity, CPEs located within the slivers in FIG. 9, will cause U/S interference at the Hubs.

U/S interference is different from D/S interference in the sense that CPEs that are located within the slivers (which occupy a quite small area) will cause interference to entire sectors. This is because an upstream interference signal received at a hub or base station will have an effect on all signals arriving at the base station from CPEs located anywhere in the sector. Referring to FIG. 9, the area that is subject to U/S interference (marked with slanted lines) occupy 75% of the network area despite the fact that the interference causing CPEs are located within only about 4% of the total area. Therefore it is imperative to take measures to ensure that single CPEs are not allowed to take out large portions of the service area.

One way to get around this problem is to have a subset of channels set aside to be utilized in these slivers. The drawback is that this has a negative effect on the frequency re-use.

Other options would be to simply not provide service in these slivers or to modify the cell layout.

By adjusting the polarization of the sectors as shown in FIG. 10, it is possible to decrease the number of interference slivers. As in FIG. 4 the sectors marked with the hatched lines have the same polarization. As can be seen, now only 2 slivers per hub are affected as opposed to three with the previous polarization scheme. To avoid the interference in these slivers it is possible to deploy the spare frequencies that are set a side just for this purpose. It should be recognized that this polarization scheme should only be used in situations where a guard band is present between U/S and D/S channels, otherwise severe hub-to-hub adjacent channel interference may occur!

Again, it can be seen from FIG. 11, that CPE interference coming from a small overall area (within the slivers) has an impact on almost the entire network.

To illustrate the concept with spare frequencies, see FIG. 12. The assumption here is that a minimum of 2 frequencies must be available.

In FIG. 12, X,Y designate frequency group X for the D/S and frequency group Y for the U/S

| Where, | |
| --- | --- |
| D/S Frequency group 1: | $F_1$ |
| D/S Frequency group 2: | $F_2$ |
| D/S Frequency group 3: | $F_1, F_3 \ldots F_n$ |
| D/S Frequency group 4: | $F_2, F_3 \ldots F_n$ |
| U/S Frequency group 1: | $f_1$ |
| U/S Frequency group 2: | $f_2$ |
| U/S Frequency group 3: | $f_1, f_3 \ldots f_n$ |
| US Frequency group 4: | $f_2, f_3 \ldots f_n$ |

As discussed previously, the interference caused by a third row interferer is 9.5 dB which is not enough since this is right on the operating margin for the D/S and below the margin on the U/S.

In order to achieve the required C/I along the edges of the slivers (where the C/I is the worst for the area not included by the sliver) the CPE antenna pattern has to be taken into account.

Using Equation 1-4, and evaluating measured CPE antenna pattern, the sliver widths can be calculated. The resulting values are listed in Table 2.

TABLE 2

| Sliver Widths for 3$^{rd}$ row Interference | | | |
| --- | --- | --- | --- |
| Sliver Width [°] | | C/I Required [dB] | |
| U/S | D/S | U/S | D/S |
| 5.4 | 3.9 | 19 | 14 |

From Table 2, it can be seen that the worst case sliver width is 5.4°. Assuming since each sliver is shared between two sectors, the worst case interference area ratio in any sector is then:

$$I_{max} = \frac{5.4°}{90°} = 6.0\%$$

This interference area is present in ¼ of all the sectors. Another ½ have an interference ratio of 3.0% and the remaining ¼ have no interference at all.

If only three frequencies are used the overall frequency re-use is approximately 67%. Worst case C/I:s occur along the sliver edges and are equal to (or better) than the required C/I:s listed in Table 1.

It is possible to achieve 100% re-use in the network if one decides to provide no service in the slivers affected by interference. This may be justifiable in a scarce spectrum deployment where one can not afford to set spare frequencies aside. For 100% re-use one would have to give up $$I_{100\%} = \frac{2*5.4°}{360°} = 3.0\%$$

of the overall area to be serviced.

However, in the foregoing assumptions have been quite conservative in the sense that: flat terrain, no building obstructions, 100% Fresnel zone clearance etc. have been used. All these and other factors can be advantageous in providing means to reduce the intra-network interference. When an actual network is being designed, using RF planning software (CAD), these factors are taken into account.

To minimize the area affected by D/S and U/S interference, the network should ideally be deployed using the polarization scheme illustrated in FIG. 12.

Depending on the: locations of the CPEs and the overall required capacity per sector, it is possible to choose between the following options:

1. Deploy with the use of spare frequencies within the interference slivers, at the expense of frequency re-use. (The advantage is that service can be offered anywhere within the coverage area defined by pure received signal levels above receiver threshold).
2. Use 100% frequency re-use, and simply not offer service within the slivers. (This may be a good option if the geographical locations of the users and hubs are such that none or very few of the users are affected).

By rotating the sectors in the range +/−17.5° to 27.5° and more particularly by +/−22.5° it is possible to place four cells where no co-polarized interferers are aligned with the desired hub-subscriber link. By using antennas with an almost constant gain within the 90° main beam, i.e. having a −1 to −3 dB beamwidth of 90° there would be no need to change the geographical centers of the hub relative the straight grid layout. The slanted hub scheme described below is the one with the best C/I performance.

In FIG. 13, X,Y designate frequency group X for the D/S and frequency group Y for the U/S

| Where, | |
| --- | --- |
| D/S Frequency group 1: | $F_1 \ldots F_n$ |
| U/S Frequency group 1: | $f_1 \ldots f_n$ |

The downstream C/I in the 4 hub slanted lay out will be: 3$^{rd}$ row interference C/I+ the combined effect of CPE and hub antenna polarization discrimination.

Simulation using RF planning software has shown that the worst case downstream C/I is 24 dB and the U/S C/I is 21 dB.

As pointed out earlier, the slanted 4 hub layout exhibits minimal co-polar interference on both the U/S and D/S, while still providing 100% frequency re-use over the entire coverage area. In fact, this would in many cases be the preferred configuration for small networks.

The slanted hub concept introduced in FIG. 13 can be expanded to 9 hub (3×3 as shown in FIG. 14), and larger networks as well. However, the interference will increase and a trade-off between coverage and frequency re-use must be made. There will be some slivers with lower C/I. The interference in these slivers (or caused by CPE: in theses slivers) will be of $5^{th}$ order thus according to Equation 1-2.

$$C/I(5^{th}\text{row})=14 \text{ dB}$$

This is just on the border to the minimum required D/S C/I, and it is too low for the U/S.

In order to overcome this problem there are some alternatives:

1. Don't deploy CPEs at all within the interference slivers.
2. Use Equation 1-3 to calculate how far away from the hubs, one can place CPEs without violating the required C/I:s. This alternative can be used in conjunction with alternative 1 or 3.

| Normalized distance from hub | | C/I Required [dB] | |
|---|---|---|---|
| U/S | D/S | U/S | D/S |
| 0.5 | 1.0 | 19 | 14 |

3. Use spare frequencies according to FIG. 14.

In FIG. 14, X,Y designate frequency group X for the D/S and frequency group Y for the U/S

| Where, | |
|---|---|
| D/S Frequency group 1: | $F_1$ |
| D/S Frequency group 2: | $F_2 \ldots F_n$ |
| D/S Frequency group 3: | $F_1 \ldots F_n$ |
| U/S Frequency group 1: | $f_1$ |
| U/S Frequency group 2: | $f_2 \ldots f_n$ |
| U/S Frequency group 3: | $f_1 \ldots f_n$ |

Simulation using RF planning software has shown that the worst case downstream C/I is about 24 dB and the U/S C/I is 18 dB.

At the expense of reduced frequency re-use it is possible to find a network configuration that is scaleable to unlimited size networks.

In the following analysis it is assumed that a minimum of 4 channels are available on the D/S and the U/S respectively. Furthermore, it turns out that this channelization scheme is applicable to both D/S and U/S.

With the concept of slanted cells one finds that in order to achieve C/I=19 dB the interfering frequency may be re-used at N=3,7,9 . . . where N is the row number. These values are found taking the polarization discrimination of the transmitted signals into account. If one on the other hand disregards the effect of polarization and treats all signals as being co-polar, then the distance to the interferer has to be at least N=9 to get C/I=19 dB.

The problem is that if one wants to optimize the frequency re-use by deploying the same frequency (f), in sectors where $N_1$=3,7,9 . . . , the scheme breaks down. The reason is that although this re-use works for the first sector ($S_1$), as soon as that frequency is re-used in sector $N_1$=3 ($S_2$), now this sector ($S_2$), can only see its frequency be re-used at $N_2$=3,7, 9 . . . , but $N_2$=$N_1$-2 which means that when (f) is re-used in the sector where $N_1$=7, then $N_2$=5 which is not allowed.

It is therefore necessary to increase the separation between sectors using the same frequencies. According to FIG. 15, let the following re-use apply:

use (f) in $N_1$=3,9 . . . and in $N_2$=7,9 . . .

Referring to FIG. 15, one can see that if a given frequency f, is used in all the sectors marked with $S_n$ where (n=1 . . . 4), there is sufficient separation $D_1$, between $S_1$ and $S_3$ even though they are co-polarized. In the same manner the distance between $S_2$ and $S_3$ is also alright, since these two sectors now are cross-polarized. In FIG. 15 and the FIGS. 16, 18 and 19 the solid dot indicates the sectors having common polarization.

FIG. 16, illustrates sectorization and polarization of a 4×4 cluster building block.

FIG. 17, shows the frequency re-use to be used in the 4×4 cluster. Each number identifies one frequency group. If only 4 frequencies are available then each group will contain only one unique frequency. The overall frequency re-use in this case will be 25%.

If, one the other hand more than four frequencies are available, per D/S and U/S respectively, then each frequency group will have one unique frequency pair (1, 2, 3 or 4) for D/s and U/S as well as a pool of frequencies that are common between all four groups. The common frequencies may be used in most parts of any sector but within the slivers where interferer(s) line up ($\Psi$=0°, ±45°, ±135° and 180°), the CPEs that are within that sliver should be using the unique frequency (different for D/S and U/S) assigned to that sector.

| Where, | |
|---|---|
| D/S Frequency group 1: | $F_1, F_5 \ldots F_n$ |
| D/S Frequency group 2: | $F_2, F_5 \ldots F_n$ |
| D/S Frequency group 3: | $F_3, F_5 \ldots F_n$ |
| D/S Frequency group 4: | $F_4, F_5 \ldots F_n$ |
| U/S Frequency group 1: | $f_1, f_5 \ldots f_n$ |
| U/S Frequency group 2: | $f_2, f_5 \ldots f_n$ |
| U/S Frequency group 3: | $f_2, f_5 \ldots f_n$ |
| U/S Frequency group 4: | $f_3, f_5 \ldots f_n$ |

By overlaying the hub/sector layout and the polarization layout one ends up with a 4×4 cluster that is scaleable to unlimited size networks, which is illustrated in FIG. 18.

Even in the final layout presented here, it is not possible to entirely avoid any interference slivers. For instance, consider FIG. 19.

Consider a CPE placed at the location marked with a star in FIG. 19. This CPE will experience a D/S C/I of 16.9 dB, which is sufficient. On the other hand the U/S C/I also will be 16.9 dB which is 2.1 dB short of what is required.

The sliver width corresponding to 2.1 dB C/I improvement is only 3.17°, which corresponds to 222 m at the cell edge (assuming 4 km cell radius). As said earlier, not the entire sliver will have a C/I below the acceptable value, but instead the C/I will improve closer or the hub. The part of the sliver that may not be useable will be a small area close to the cell edge. The approximate relative extent of this area is illustrated in FIG. 20. However this area may sometimes depend on the actual geography of the deployment area and still be useable if LOS (line of sight) to the interferer is obstructed (which is quite likely during practical scenarios). In any event, the interference area is typically a very small area and in many cases it can be justified to sacrifice this area for the benefit of overall frequency re-use.

Simulation of a 5×5 hub network has shown worst case D/S C/I of 16.3 dB and worst case U/S C/I of 19.6 dB which is satisfactory. As always though, deployment of real networks must be carried out using RF Planning tool so that characteristics of the local geography and morphology can be taken into account.

When a real network is to be deployed it is necessary to gather some important information before any detailed planning can take place. Examples of this information include: service requirements of the customers; customers' geographical locations; number of customers per sector, potential hub locations; and terrain and clutter data of the coverage area.

As pointed out earlier the slanted hub layout is preferred over the straight hub layout due to its improved C/I, which allows for a better frequency re-use. For initial deployment in a new area one has to consider the future capacity requirements in terms of users per sector and their bandwidth needs. In order to make the network scaleable it is recommended to start right off the bat with the slanted hub design. If it is expected that the network will grow to expand to an area larger than what can be covered by 4 hubs (100% frequency re-use) it has to be recognized that a trade-off between capacity and coverage will have to be made at a later stage. The reason for is that as the net work grows one has to drop the number of frequencies being re-used in each sector. For a 3×3 network the average frequency re-use is 83% for 3 frequencies or 87% for 4 frequencies. For a 4×4 or larger, the re-use is 25% (for 4 channels on D/S and U/S respectively).

If one opts for maintaining 100% re-use there will inevitably be slivers where no service may be offered. If the number of potential customers (current and future) is small within these slivers, it may be acceptable to employ the scheme which offers 100% re-use. If on the other hand it is deemed important to offer service over the entire network area, then the reduced re-use for large networks will have to be taken into account from the beginning. Other options which may be considered to achieve a higher capacity include reducing the cell radius or to increase the number of sectors per cell.

In summary, to make the best use of the available resources the following is recommended:

If the service area can be covered by 2×2 hubs:

Use slanted hubs as per FIG. 13.

100% frequency re-use can be achieved for 100% area coverage

If 3×3 hubs are required to cover the area:

Use slanted hubs as per FIG. 14.

Since the frequency re-use is reduced to 83% for 3 frequencies or 87% for 4 frequencies, (for close to 100% area coverage) the hubs will have to be placed closer together in order to compensate for reduced capacity (fewer channels available)

If more than 3×3 hubs are required to cover that area:

Use slanted hubs as per FIG. 18.

Since the frequency re-use is reduced to 25% (for close to 100% area coverage) the hubs will have to be placed closer together in order to compensate for reduced capacity (fewer channels available).

TABLE 4

Summary Table

| Property | 2 × 2 Straight | 2 × 2 Slanted | 3 × 3 Slanted | >3 × 3 Slanted |
|---|---|---|---|---|
| Applicability | Small Networks | Small Networks | Medium Networks | Large Networks |
| Reuse - Coverage | | | | |
| 3 Carriers | | 100%–100% or 100%–100% | | |
| " | 100%–94% or 67%–100% | | >83%–100% | N/A |

TABLE 4-continued

Summary Table

| Property | 2 × 2 Straight | 2 × 2 Slanted | 3 × 3 Slanted | >3 × 3 Slanted |
|---|---|---|---|---|
| 4 Carriers | | 100%–100% or 100%–100% | | |
| " | 100%–94% or 75%–100% | | >87%–100% | 25%–100% |
| C/I | | | | |
| D/S | 14 dB | 24 dB | 24 dB | |
| U/S | 19 dB | 21 dB | 18 dB | |

TABLE 5

U/S B-band Carrier Frequency Plan

| Direction | BW: Carrier Bandwidth [GHZ] | N: # of Carriers | Centre Frequency of n:th [GHz] | Range of n: |
|---|---|---|---|---|
| D/S | 0.021 | 3 | $f_n = (0.075 - N*BW)/2 + N*BW/2 + 31.00$ | $n = 1 \ldots N$ |
| | 0.018 | 4 | | |
| | 0.014 | 5 | | |
| U/S | 0.009 | 8 | $f_n = (0.075 - N*BW)/2 + n*BW/2 + 31.225$ | $n = 1 \ldots N$ |
| | 0.007 | 10 | | |

Although specific embodiments have been described and illustrated it will be apparent to one skilled in the art that numerous alternatives to those described can be implemented without altering the basic concept of the invention. It is to be understood that such alternatives will fall within the full scope of the invention as defined by the appended claims.

| GLOSSARY | |
|---|---|
| BS | Base Station |
| CPE | Customer Premise Equipment |
| LOS | Line of Sight |
| LMDS | Local Multipoint Distribution System |
| LMCS | Local Multipoint Communication System |
| SINR | Signal to Interference plus Noise Ratio |
| C/I | Carrier to Interference Ratio |

What is claimed is:

1. A method of reducing inter cell interference in a cellular wireless commutations system having multiple adjacent cells which provide service to a geographic area, each cell having a base station with a sectored antenna for bi-directional communication with customer premise equipment located in sectors of said cells, each cell being divided into four sectors, the base stations in adjacent cells being arranged in a straight grid configuration wherein the base stations are located in rows and columns, the method comprising:

Selecting three or more frequency sets for upstream and downstream communication between said base stations and said customer premise equipment;

employing an orthogonal polarization diversity scheme between communications in adjacent sectors within each cell and between cells; and rotating the sectors in each cell such that dividing lines between sectors are off-set relative to the grid configuration by a configurable angle, the configurable angle being in the range +/−17.5° to +−27.5° and offset in one direction in every second row and offset in an opposite direction in intermediate rows, whereby the combination of the polarization diversity scheme, frequency set selection and rotating the sectors reduce the number of interference zones between adjacent sectors.

2. The method as defined in claim 1 wherein said configurable angle is +/−22.5°.

3. The method as defined in claim 1 wherein there are four cells arranged in a two by two grid configuration and the configurable angle is +/−22.5°.

4. The method as defined in claim 1 wherein the are nine cells arranged in a three by three grid configuration.

5. The method as defined in claim 4 wherein a separate additional frequency set is used to provide service to said one or more interference zones.

6. The method as defined in claim 4 wherein no service is provided to said one or more interference zones.

7. The method of claim 1 wherein there are sixteen cells arranged in a four by four grid configuration.

8. The hod of claim 7 wherein multiple clusters of four by four grid configurations ae employed.

9. A system for reducing inter cell interface in a cellular wireless communications system having multiple adjacent cells to provide communications services to a geographic alma the system comprising:

a base station in each cell having a sectored antenna for providing bi-directional communication with customer premise equipment (CPE) located in sectors of said cells each cell being divided into four sectors, the base stations in adjacent cells being arranged in a straight grid configuration wherein the base station are located in rows and columns;

a directional antenna at each CPE for receiving downstream communication from said base station and transmitting upstream communication to said base station means to select one frequency set from three or more frequency sets for upstream and downstream communication between said base stations and said customer premise equipment;

means to employ an orthogonal polarization scheme between communications in adjacent sectors and between cells; and means at said base station to configure the sectors in each cell such that nominal dividing lines between sectors arm off-set relative to the grid configuration by a configurable angle, the configurable angle being in the range of +/−17.5° to +/−27.5° and offset in one direction in every second row and offset in an opposite direction in intermediate rows, whereby the combination of the polarization diversity, frequency set selection and rotating of the sectors reduced the number of interference zones between adjacent sectors.

10. The system as defined in claim 9 wherein said offset is +/−22.5°.

* * * * *

UNITED STATES PATENT AND TRADEMARK OFFICE
CERTIFICATE OF CORRECTION

PATENT NO. : 6,847,820 B1
DATED : January 25, 2005
INVENTOR(S) : Goran Hageltorn et al.

It is certified that error appears in the above-identified patent and that said Letters Patent is hereby corrected as shown below:

Column 14,
Line 51, "commutations" should read -- communications --

Column 15,
Line 14, "the" should read -- there --
Line 23, "hod" should read -- method --
Line 24, "ae" should read -- are --
Line 25, "interface" should read -- interference --
Line 28, "alma" should read -- area --

Column 16,
Lines 1-2, "said cells each cell" should read "said cells, each cell"
Line 19, "arm" should read "are"
Line 25, "reduced" should read -- reduce --

Signed and Sealed this

Twenty-sixth Day of April, 2005

JON W. DUDAS
*Director of the United States Patent and Trademark Office*